Dec. 26, 1939.  L. F. HEMPHILL  2,184,344
ELECTRIC CIRCUIT
Filed Aug. 25, 1936
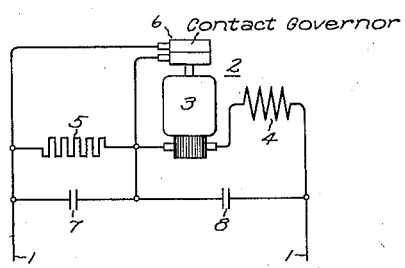
Inventor:
Lawrence F. Hemphill,
by Harry E. Dunham
His Attorney.

Patented Dec. 26, 1939

2,184,344

UNITED STATES PATENT OFFICE 2,184,344

ELECTRIC CIRCUIT

Lawrence F. Hemphill, Fort Wayne, Ind., assignor to General Electric Company, a corporation of New York Application August 25, 1936, Serial No. 97,812

6 Claims. (Cl. 171—229)

My invention relates to electric circuits and more particularly to improvements in speed responsive contact governed motor connections.

As the term is widely used in the art, a contact governor is a speed responsive switch used for controlling or governing the speed of an electric motor. Usually it is a centrifugally actuated switch having contacts which either go from an open to a closed position or vice versa, when the motor speed exceeds a given normal value, depending upon how the motor is controlled.

When the contacts control the current in the field circuit of a shunt motor the contacts close on over-speed and open on under-speed, while when they control a series motor or a shunt motor by controlling the main current supply to the motor they are arranged to open on over-speed and close on under-speed. Usually the contacts are connected across a resistor in the control circuit so that they do not actually open and close the circuit but merely vary the effective value of the resistor in the control circuit. It is also customary to connect a capacitor across the switch so as to prevent arcing and sparking at the contacts.

Such a circuit produces an objectionable amount of noise. In investigating the cause of this noise I have found that when the motor coils alone are connected in circuit with the contact governor they will emit a considerable amount of noise and that when they are placed on the motor core the noise is greatly amplified. I believe the cause of this noise is the steep voltage wave front and very high frequency surges which are set up when the contacts of the governor open. These transients, I believe, produce minute displacement or vibration of the coils as the current through the coils changes rapidly.

In accordance with my invention I overcome this difficulty by connecting a properly proportioned impedance in parallel with those components of the motor producing noise. If the impedance is a resistor the noise level of the motor is appreciably reduced but an impedance in the form of a capacitor of proper size reduces the motor noise level to a more satisfactory degree. The reason I use the expression—impedance in the form of a capacitor—is that at the very high frequencies encountered a conventionally designed capacitor with its leads is often actually an inductive reactance instead of a capacitive reactance. This is because the inductive reactance of the leads increases as the frequency increases while the capacitive reactance of the capacitor decreases as the frequency increases.

An object of my invention is to provide a new and improved electric circuit.

Another object of my invention is to provide a circuit for reducing the noise produced by contact governed electric motors.

My invention will be better understood from the following description taken in connection with the accompanying drawing and its scope will be pointed out in the appended claims.

Referring now to the single figure of the accompanying drawing, which illustrates diagrammatically an embodiment of my invention, there is shown therein a supply circuit 1 to which is connected an electric motor 2. This motor is shown by way of example as a fractional horsepower universal series motor having an armature 3 and a series field winding 4. Connected in series with the motor is a suitable resistor 5 across which are connected the contacts (not shown) of a contact governor 6 of any well known construction. A conventional capacitor 7 is connected in parallel with the resistance 5 and the contacts of the governor 6. This capacitor is so proportioned as to prevent sparking or burning of the contacts of the governor.

Connected in parallel with or across the motor 2 is a second capacitor 8 which is so proportioned as to eliminate substantially the electro-magnetically produced noise in the motor 2 caused by the rapid opening and closing of the contacts of governor 6.

In a particular circuit which I have successfully tested the capacitor 7 has a capacitance of .25 of a microfarad while capacitor 8 has a capacitance of 1.5 microfarads.

In the operation of my invention, when the supply circuit 1 is energized the motor starts in the usual manner and until it comes up to the predetermined speed at which it is desired to hold the motor, the contacts of the governor 6 stay closed, thereby short circuiting the resistor 5. As soon as the motor gets up to normal speed the contacts of governor 6 open thereby inserting the resistance 5 in the motor circuit and causing it to slow down again. The contacts thereupon separate again and the motor speeds up, this cycle being repeated very rapidly and holding the motor at an average speed corresponding to the normal speed desired. I have found that this rapid opening and closing of the contacts subjects the motor coils to current surges of such steep wave front that the minute and rapid motion or vibration of the coils produces an objectionable sound or noise. The condenser 8 minimizes the effect of the steep wave front surges to such an extent that objectionable noise is eliminated.

While I have shown and described a particular embodiment of my invention, it will be obvious to those skilled in the art that changes and modifications can be made therein and I, therefore, aim in the appended claims to cover all such changes and modifications as fall within the true spirit and scope of my invention.

What I claim as new and desire to secure by Letters Patent of the United States is:

1. In combination, an electric circuit, a universal fractional horse-power series motor connected in said circuit, a resistor connected in series with said motor, a centrifugally actuated speed governing switch operated by said motor and having its contacts connected across said resistor, a capacitor proportioned to prevent sparking of said switch contacts connected thereacross, said motor having elements which emit objectionable noise as a result of the operation of said governing switch and a second capacitor connected across said noise producing elements of said motor, said second capacitor being proportioned to eliminate substantially the noise produced by said elements as a result of the opening and closing of said governor contacts.

2. In combination, an electric circuit, a fractional horse power series motor connected therein, a regulating resistor connected in series with said motor, a centrifugal operated speed governor driven by said motor and having a pair of contacts connected across said resistor, a capacitor connected directly across the contacts of said governor, all of said above-mentioned elements being so correlated that said motor emits a substantial and objectionable amount of noise as a result of the contact action of said governor, and an impedance in the form of a capacitor connected in series circuit relation with said first mentioned capacitor and in parallel circuit relation with the armature and field windings of said motor, said impedance having a capacitance value which is substantially different from the value of said capacitor and which is such as substantially to reduce the noise emitted by said motor.

3. In combination, an electric circuit, windings connected in said circuit, a magnetic core for said windings, means for causing such periodic steep wave form changes in potential to be applied to said windings that said core and windings emit an objectionable noise as a consequence thereof, and means for substantially reducing said noise comprising an impedance connected in parallel with said windings and in series circuit relation with said means for causing the application of steep wave form changes in potential to said windings.

4. In combination, an electric circuit, windings connected in said circuit, a magnetic core for said windings, means for causing such periodic steep wave form changes in potential to be applied to said windings that said core and windings emit an objectionable noise as a consequence thereof, and means for substantially eliminating said noise comprising an impedance in the form of a capacitor connected in parallel with said windings and in series circuit relation with said means for causing the application of steep wave form changes in potential to said windings.

5. In combination, an electric motor, a speed regulating contact governor therefor, said motor having elements which emit noise as the result of the contact governor action, and an impedance whose value is such as substantially to eliminate the production of noise in said motor as a result of contact governor control connected in parallel with noise producing elements of said motor and in series circuit relation with said contact governor.

6. In combination, an electric motor, a speed regulating contact governor therefor, said motor having elements which emit noise as the result of the contact governor action, and an impedance in the form of a capacitor whose value is such as substantially to eliminate the production of noise in said motor as a result of contact governor control connected in parallel with the windings of said motor which produce said noise and in series circuit relation with said contact governor.

LAWRENCE F. HEMPHILL.